United States Patent Office 2,794,784
Patented June 4, 1957

2,794,784

COPPER-CONTAINING CATALYSTS

Alio J. Buselli, New Providence, N. J., and Francis E. McKenna, New York, N. Y., assignors to Air Reduction Company, Incorporated, New York, N. Y., a corporation of New York No Drawing. Application January 21, 1953, Serial No. 332,544

2 Claims. (Cl. 252—476)

This invention relates to copper-containing catalysts for use in catalytic polymerization, such as in the polymerization of acetylene for the production of polyacetylene (cuprene), and has for its object the provision of an improved cuprous oxide ($Cu_2O$) catalyst and a method of producing the catalyst.

The polymerization of acetylene with cuprous oxide at temperatures around 200 C. to 300° C. with varying results has been described in the literature. For reasons not fully understood, the cuprous oxide or its reduced metal becomes incorporated in the polymer and this accounts for it being called cuprene. In the practices described heretofore from 2% to 10% of copper becomes incorporated in the polymer. This not only results in a loss of copper but necessitates an additional treatment for its removal.

In its broader aspects, the invention provides a cuprous oxide catalyst having superior activity formed by the oxidation of copper to cupric oxide ($CuO$) and its reduction with carbon monoxide to cuprous oxide. In an especially effective embodiment of the invention, a film or thin layer of cuprous oxide is formed on metallic copper by oxidizing a layer of cupric oxide on the metallic copper with an oxygen-containing gas, such as air, at an elevated temperature, and then reducing the cupric oxide to cuprous oxide with carbon monoxide. The metallic copper may be in any suitable shape or form, such as wire, rods, strips, sheets, discs, tubes, pellets or granules.

The invention gives significant improvements, both in the formation of the catalyst and in the polymerization. One surprising advantage of the improved catalyst is that only a relatively small amount of cuprous oxide is required in relation to the mass of copper and that copper contamination of the polymer is materially reduced. The cuprous oxide itself, regardless of its coating on copper, is a very active catalyst. One especially advantageous feature of the invention is that the catalyst can be reactivated in a very simple manner with an oxygen-containing gas which first removes any adhering cuprene and forms a film of cupric oxide which is reduced to the very active form of cuprous oxide with carbon monoxide.

In producing a cuprous oxide catalyst in accordance with the invention, the metallic copper in any desired shape or form is oxidized with air at a temperature preferably around 200° C. to 400° C. and for a sufficient time, say, around 45 minutes, to form the desired layer of cupric oxide. Following oxidation, the cupric oxide surface is reduced at temperatures up to 500 C., preferably at 300° C., with carbon monoxide to cuprous oxide. While the cuprous oxide thus formed may be used in any suitable catalytic operation, one advantageous method is described and claimed in our copending application Serial No. 332,278, filed January 21, 1953, now U. S. Patent No. 2,743,264. Briefly, this method comprises a cyclic treatment in which the metallic copper having an active catalytic surface is used to catalyze acetylene polymerization. Following the diminished activity of the catalyst, the catalyst is reactivated by oxidation and reduction as aforementioned and the operations are repeated in sequence over and over again.

In comparative operations, acetylene gas at the rate of 2 liters per minute and nitrogen at the rate of 7 liters per minute were passed into a reactor at about 300° C. in contact with copper discs having about 20 sq. in. of active surface. One disc was coated with cuprous oxide formed by oxidation with nitric oxide at 400° C. Two operations with this catalyst gave 0.047 and 0.059 g. of cuprene per hour per sq. in. of catalyst surface.

Another disc was oxidized for 45 minutes at 400° C. with air and then reduced with carbon monoxide for 45 minutes at the same temperature. Two operations with this catalyst gave 0.37 and 0.39 g. of cuprene per hour per sq. in. of catalyst surface.

We claim:

1. The method of forming a cuprous oxide catalyst which comprises oxidizing the surface of metallic copper with an oxygen-containing gas at a temperature above 350° C. to form a layer of cupric oxide, and reducing the layer of cupric oxide with carbon monoxide at a temperature of from 200° C. to 400° C.

2. The method of forming a catalyst for the polymerization of acetylene which comprises oxidizing the surface of metallic copper to form a layer of cupric oxide, and reducing said cupric oxide layer to cuprous oxide with carbon monoxide at a temperature of from 200 to 500° C.

References Cited in the file of this patent

UNITED STATES PATENTS

| | | |
|---|---|---|
| 2,304,078 | Drapeau et al. | Dec. 8, 1942 |
| 2,438,451 | Owen | Mar. 23, 1948 |
| 2,554,319 | Ayers | May 22, 1951 |

OTHER REFERENCES

Greenawalt's "Hydrometallurgy of Copper," New York, 1912, page 160.